No. 765,399. PATENTED JULY 19, 1904.
E. K. REA.
CORN HARVESTER, &c.
APPLICATION FILED OCT. 6, 1902.
NO MODEL.

WITNESSES:
W. H. Cotton
Arthur B. Seibold

INVENTOR.
Edmund K. Rea.
BY
ATTORNEY.

No. 765,399. Patented July 19, 1904.

UNITED STATES PATENT OFFICE.

EDMUND K. REA, OF OVID, MISSOURI.

CORN-HARVESTER, &c.

SPECIFICATION forming part of Letters Patent No. 765,399, dated July 19, 1904.

Application filed October 6, 1902. Serial No. 126,083. (No model.)

*To all whom it may concern:*

Be it known that I, EDMUND K. REA, a citizen of the United States, and a resident of Ovid, county of Ray, and State of Missouri, have invented certain new and useful Improvements in Corn-Harvesters and Like Machines, of which the following is a specification and which are illustrated in the accompanying drawings, forming a part thereof.

This invention relates to means for guarding the knife of a corn-harvester or other machine usually provided with an exposed cutting-knife in order to prevent injury to the attendant or operator in case he moves against the knife or steps in front of the same while the harvester is in motion. The desired end is attained by providing a guard normally located or projecting in advance of the cutting edge of the knife and means for changing the relative position of the guard and knife when it is desired to put the machine into action.

The invention also contemplates the provision, in connection with the foregoing, of means for maintaining the knife in its exposed or cutting position and means for automatically restoring the parts when the first-mentioned means are released, so that the guard will again be in advance of the knife.

In the embodiment of the invention shown and described herein the knife is made to move while the guard is stationary. The precise arrangement is, however, immaterial, and the construction may be greatly varied in detail, as in the manner of operating the parts so as to change the relative positions of the knife and guard, without departing from the spirit of the invention. For example, the guard may be made to move and be held normally in advance of the knife, as is shown and claimed in an application for patent filed by me contemporaneously herewith.

The invention consists of the arrangement and combination of parts hereinafter fully described, particularly designated in the claims, and illustrated in the accompanying drawings, in which—

Figure 1:
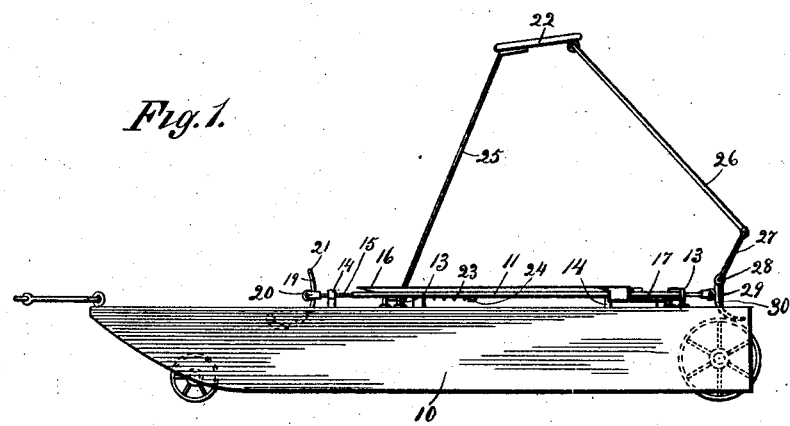
Figure 3:
Figure 2:
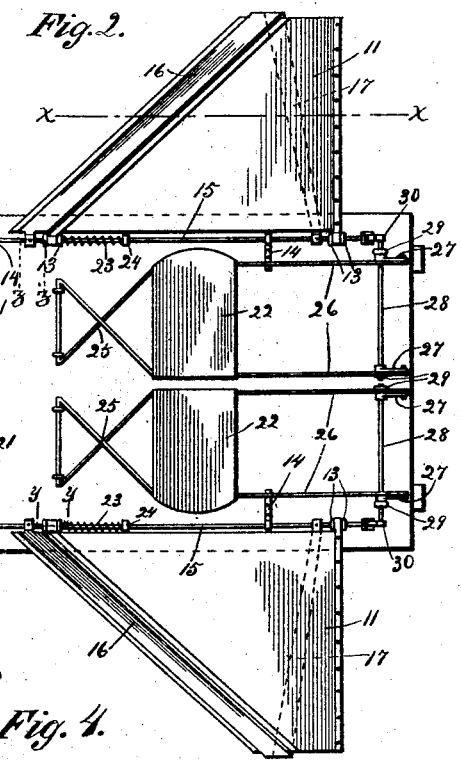
Figure 5:
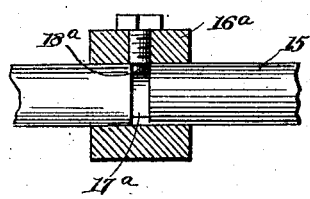
Figure 4:
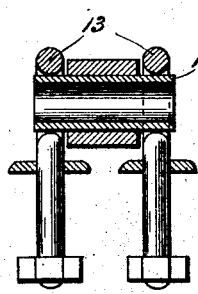

Figure 1 is a side elevation of a corn-harvester of ordinary construction having the guard of my invention applied thereto. Fig. 2 is a plan of the same. Fig. 3 is a section on the line $x$ $x$ of Fig. 2. Fig. 4 is a section on the line $y$ $y$ of Fig. 2, and Fig. 5 is a section on the line $z$ $z$ of Fig. 2.

In the drawings I have shown the invention in connection with a corn-harvester of a common type comprising a wheel or runner supported platform 10, provided with a hinged leaf or wing 11 projecting from each side and at the front end of which is located a cutting-knife 16. This knife differs in its mounting from that usually employed, as will be hereinafter explained.

In harvesting with a machine of the kind just described the operator or attendant usually stands or sits upon the platform and gathers in his arms the cornstalks as they fall and when he has an armful steps off the platform to carry the same to the shock. As he frequently steps in front of the knife, he runs great risk of being cut, inasmuch as it sometimes happens that the draft-animals do not stop when ordered to do so. With such exposed knife there is also danger of moving or falling against the same and being cut even when the harvester is not moving. The guard of the present invention overcomes this danger by reason of its automatic action; it being so constructed and operated that whenever the operator leaves the platform the knife is immediately guarded, so that nothing can come in contact with the same.

The harvester shown has two cutting-knives, and each is designed to be provided with a guard; but as both are in all respects alike a description of one will serve for both.

In the construction illustrated each leaf 11 is swiveled or hinged near each end on a tubular section 12, which is secured by eyebolts 13 to the platform of the harvester, permitting the leaf to swing upwardly in the usual manner.

Extending parallel with the side of the platform 10 and passing through guides 14, secured to the platform, and also, if desired, through the alined tubular hinge-sections 12, is a rod or bar 15, which is designed to be moved or slid longitudinally, and extending out over the leaf 11 and fixed at its inner end to the slidable rod or bar 15 is a knife 16. This knife or cutter is sharpened at its front edge and may be inclined at an angle to the direction of movement of the machine in the usual manner, the front of the said leaf extending parallel with the cutting edge. In order to better support the knife 16 and hold it sufficiently rigid, its outer end may be attached to a brace bar or strip 17, the inner end of which is secured to the slidable rod 15.

The connection of the knife 16 and its brace-bar 17 to the sliding rod 15 is shown in Fig. 5. Each of such parts is provided with a tubular sleeve 16$^a$, through which the rod 15 passes, and the latter is provided at a point inclosed by the sleeve with a groove 17$^a$, which receives the end of a pin 18$^a$, passing through the sleeve. This arrangement fixes the knife to the rod in such manner that the knife is advanced or retracted by the longitudinal movement of the rod, and yet is free to be swung or turned up with the leaf 11.

Pivoted to the platform 10, as at 18, and projecting upwardly is a cam consisting of a curved bar 19, which passes behind and engages a friction-roller 20, carried at the forward end of the slide-rod 15. Said cam has fixed to it a foot-bar 21 within reach of the attendant occupying the seat 22. When pressure is exerted against the foot-bar, the cam will be turned on its pivot and moved forward and upwardly past the friction-roller 20 at the end of the slide-rod and draw the latter forward and with it the attached knife 16. The range of movement of this rod is such that when advanced the edge of the knife 16 will be moved far enough in advance of the front edge of the leaf to properly perform its cutting function, and when in such position the cam 19 will have been turned until the friction-roller 20 is close to the pivot of the curved bar 19, thereby so increasing the leverage that very slight pressure will be required to hold the knife against the resistance of the corn while the latter is being cut. A spring 23 is employed for returning the rod to its former position, and such spring may be coiled about the rod and react between a shoulder 24, secured to the latter and the forward one of the hinges of the leaf 11. When the cam 19 is released by the removal of the foot, the spring 23, having been compressed by the rod 15, will expand and move the rod rearward, and with it the knife 16, until the edge of the latter is in the rear of the front edge of the platform, the latter then guarding the knife, so that in case the operator steps or falls in front of the knife while the horses are moving he will not be cut, owing to the intervention of the guard. As soon as the machine goes into action it is only necessary to press upon the foot-piece in order to advance the knife to its cutting position.

The knife may be thrown into action by a connection with the seat 22, such connection being so arranged that when the seat is pressed down the knife will be advanced, and when the attendant rises from the seat the spring 23 will withdraw the knife in the manner heretofore explained. To this end the front of the seat is pivotally connected to the platform by a support 25, and to the rear thereof is hinged a pair of rods 26, whose lower ends are jointed to rearwardly-extending arms 27, fixed to a transverse shaft 28, journaled at 29 to the platform. The outer end of the shaft has fixed to it a cam 30, which when by pressure on the seat the arms 27 are forced rearwardly and downwardly moves the cam against the rear end of the rod 15, and thereby advances the knife, the spring 23 being compressed, and then returning the knife when the driver leaves the seat.

The seat-operated and foot-operated mechanisms may both be used, and the reaction due to pressure on the foot-piece and the seat would render action very easy. Under ordinary circumstances, however, the foot-bar will be found sufficient.

The guard is not restricted in its adaptation to corn-harvesters, but may also be used with mowers and other agricultural machines employing an exposed cutting knife or bar.

I claim as my invention—

1. In a harvester, in combination, a hinged cutting-knife and a hinged guard normally in advance of the knife, and means for changing the relative positions of such parts.

2. In a harvester, in combination, a frame, a knife hinged to the frame, a guard hinged to the frame and normally in advance of the knife and one of which parts is movable forwardly, and an operative connection for changing the relative positions of the knife and guard.

3. In a harvester, in combination, a hinged knife and a hinged guard normally in advance of the knife, means for changing the relative positions of the parts, and means for restoring the knife and guard to their normal positions.

4. In a harvester, in combination, a frame, a cutting-knife hinged to the frame, a guard hinged to the frame and normally projecting in advance of the knife-edge, one of such parts being movable forwardly, an operating connection for changing the relative positions of the knife and guard, and a spring for restoring the same to their original positions.

5. In a harvester, the combination, a carrying-platform, a forwardly-movable cutting-knife hinged to the side of the platform, a leaf also hinged to the platform and normally projecting in advance of the knife-edge, a connection for advancing the knife, and a spring for restoring the same.

6. In a harvester, in combination, a carrying-platform, a leaf hinged to the side of the platform, a longitudinally-slidable rod mounted on the platform coaxially with the leaf-hinge, a cutting-knife pivoted on the rod and having its cutting edge normally back of the front edge of the leaf, and operating mechanism for advancing the knife.

7. In a harvester, in combination, a carrying-platform, a leaf hinged to and swinging outwardly from the side of the platform, a longitudinally-slidable rod mounted on the platform coaxially with the leaf-hinge, a cutting-knife pivoted on the rod and having its cutting edge normally back of the front edge of the leaf, a lever for sliding the rod, and a spring for maintaining the rod in its retracted position.

8. In a harvester, in combination, a platform, a relatively movable knife and guard hinged to the platform, a foot-lever, connection between the foot-lever and the movable part, and a spring for retracting such part.

9. In a harvester, in combination, a knife, a stationary guard in advance of the knife, a sliding rod to which the knife is attached, a cam engaging the rod, a foot-bar fixed to the cam, and a spring reacting against the sliding rod for restoring the same to its original position.

10. In a harvester, in combination, a platform, a knife, a stationary guard in advance of the knife and secured to the platform, a forwardly-sliding rod mounted on the platform and to which the knife is attached, a cam engaging the rod for moving it forward, a foot-bar fixed to the cam, and an expansion-spring reacting against the sliding rod for moving the latter backward.

11. In a harvester, in combination, a platform, a leaf hinged to, and extending from, the side of the platform, a knife resting on the leaf and the cutting edge of which projects in advance of the leaf, a longitudinally-sliding rod mounted on the platform and to which the ends of the knife are attached, a cam engaging the rod to slide the same forward, a foot-rod fixed to the cam, and an expansion-spring coiled about and reacting against the sliding rod to return the same when moved to its original position.

12. In a harvester, in combination, a platform, a knife, a stationary guard attached to the platform and extending in advance of the knife, a longitudinally-movable rod mounted on the platform and to which the knife is attached, a pair of cams engaging the sliding rod, a foot-bar actuating one cam, a seat pivotally mounted on the platform, connection between the seat and the other cam, and a spring reacting against the sliding rod for returning the same when moved to its original position.

13. In a harvester, in combination, a platform, a knife, a stationary guard in advance of the knife and secured to the platform, a sliding rod mounted on the platform and to which the knife is attached, a cam engaging the rod for moving it forward, a seat pivotally mounted on the platform, a rod connecting the seat and the cam, and a spring reacting against the sliding rod for returning the same when moved to its original position.

14. In a harvester, in combination, a forwardly-movable knife, a guard normally in advance of the knife, an operating-lever controllable by the operator while seated on the harvester, connection between the lever and the knife, and a spring for retracting the knife, the knife and guard being hinged to the platform.

15. In a corn-harvester, in combination, a platform, a lateral wing projecting therefrom, a knife and a knife-guard both projecting obliquely from the platform and at the forward side of the wing and being relatively movable, and a foot-lever for controlling the movable part and being located in advance of the wing.

EDMUND K. REA.

Witnesses:
ARTHUR B. SEIBOLD,
LOUIS K. GILLSON.